US008239286B2

(12) United States Patent
Davis et al.

(10) Patent No.: US 8,239,286 B2
(45) Date of Patent: Aug. 7, 2012

(54) MEDIUM AND SYSTEM FOR LOCATION-BASED E-COMMERCE FOR MOBILE COMMUNICATION DEVICES

(75) Inventors: Darren R. Davis, Woodinville, WA (US); Max G. Morris, Seattle, WA (US); Robert Hildreth, Bellevue, WA (US); Ryan A. Haveson, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 11/477,962

(22) Filed: Jun. 29, 2006

(65) Prior Publication Data

US 2008/0004888 A1    Jan. 3, 2008

(51) Int. Cl.
*G06Q 30/00* (2012.01)
(52) U.S. Cl. .................................. 705/26.7; 705/14.15
(58) Field of Classification Search .................. 705/26, 705/27, 26.1, 26.7, 26.9, 14.49, 14.4, 14.1, 705/14.15, 14.53, 14.58, 14.66
See application file for complete search history.

(56) References Cited

U.S. PATENT DOCUMENTS

| | | | | |
|---|---|---|---|---|
| 6,119,101 A * | 9/2000 | Peckover | ...................... | 705/7.31 |
| 6,317,718 B1 * | 11/2001 | Fano | ........................... | 705/14.39 |
| 6,587,835 B1 | 7/2003 | Treyz et al. | ................ | 705/14.64 |
| 6,944,447 B2 * | 9/2005 | Portman et al. | ............. | 455/422.1 |
| 6,965,868 B1 * | 11/2005 | Bednarek | ...................... | 705/7.14 |
| 2001/0044309 A1 * | 11/2001 | Bar et al. | ....................... | 455/456 |
| 2002/0065739 A1 | 5/2002 | Florance et al. | | |
| 2002/0091568 A1 * | 7/2002 | Kraft et al. | ....................... | 705/14 |
| 2003/0061303 A1 | 3/2003 | Brown et al. | | |
| 2003/0065805 A1 * | 4/2003 | Barnes, Jr. | ..................... | 709/231 |
| 2003/0220835 A1 | 11/2003 | Barnes, Jr. | | |
| 2005/0125354 A1 * | 6/2005 | Pisaris-Henderson et al. | . | 705/52 |

FOREIGN PATENT DOCUMENTS

| | | |
|---|---|---|
| CA | 2326688 A1 | 7/2001 |
| KR | 1020010070471 | 7/2001 |
| WO | 02088880 A2 | 11/2002 |

OTHER PUBLICATIONS

Bhargava, Hemant K. and Feng, Juan, Pay for Play: Sponsored Recommendations in Information Gatekeepers (Feb. 25, 2006).*
"European Search Report", Mailed Date: Apr. 27, 2011, Application No. EP/07809384, Filed Date: Apr. 27, 2011, pp. 5.
Author Unknown, WayBackMachine BETA, "Adware Definition", Sep. 6, 2004, http://web.archive.org/web/20060620044233/http://www.destroyadware.com/accounts/ctdp/adprevent, 2 pages.

* cited by examiner

*Primary Examiner* — Matthew Zimmerman
(74) *Attorney, Agent, or Firm* — Mayer & Williams P.C.

(57) ABSTRACT

Wireless-enabled mobile communication devices and network nodes are configured for participation in wireless, location-based e-commerce activities. Consumers using mobile communication devices in the vicinity of physical retail locations receive opportunities to engage in e-commerce, using their mobile communication devices, with merchants operating the physical retail locations. In an exemplary e-commerce transaction, a wireless communication session is established between a mobile communication device and a wireless network access node, which may be associated with a wireless local area network ("WLAN") or a wide-area network ("WAN"). Via the wireless communication session, a consumer receives a virtual retail experience associated with the physical retail location, and an exchange of consideration between the consumer and the merchant entity is arranged. In exchange for consideration from the consumer, the consumer receives commodity.

13 Claims, 4 Drawing Sheets

MEDIUM AND SYSTEM FOR LOCATION-BASED E-COMMERCE FOR MOBILE COMMUNICATION DEVICES

BACKGROUND

Electronic networking opportunities are virtually ubiquitous. Users with devices such as personal computers ("PCs"), personal digital assistants, portable digital media players, and mobile phones are able to access wide-area networks ("WANs") and local-area networks ("LANs") in a wide variety of venues using various protocols and techniques. WANs are wireless or wired geographically dispersed networks generally covering geographic regions of more than a few hundred meters. The Internet, cellular networks, satellite networks, and cable networks are some examples of WANs. Local-area networks ("LANs") are wireless or wired networks that facilitate the transmission or receipt of information within relatively small physical areas surrounding a device or an entity such as a person or a business (generally, up to a few hundred meters). A wireless LAN ("WLAN") is generally identified by the air interface protocol(s) used for communication within the WLAN. Currently popular air interface protocols include the Wireless Fidelity ("WiFi") series of protocols promulgated by the Institute of Electrical and Electronics Engineers ("IEEE").

WANs such as cellular and satellite networks are generally accessible in outdoor areas in all but the most remote areas of many countries. Increasingly, WLANs are available to the public within areas such as retail locations, which are premises at which merchant entities accept consideration from consumers for the transfer of commodities. Examples of retail locations include but are not limited to stores, malls, transportation hubs, hotels, cafes, city blocks, movie theaters, museums, theme parks, and performance venues (such as concert facilities, theaters, and the like). WLAN coverage areas are often referred to as "hotspots". Generally, a hotspot operator offers Internet access, via a variety of access mechanisms, to wireless-enabled devices within the hotspot.

It is desirable to provide customizable, wireless, location-based systems and services that are operable with WANs or WLANs, via which users of mobile communication devices in the vicinity of physical retail locations receive specific opportunities to engage in e-commerce, using their mobile communication devices, with merchants operating the physical retail locations.

It will be appreciated that the claimed subject matter is not limited to implementations that solve any or all of the disadvantages of specific wireless services, systems or aspects thereof.

SUMMARY

Aspects of the configuration and operation of mobile communication devices and networked servers for participation in wireless, location-based e-commerce activities are discussed herein. In particular, consumers using mobile communication devices in the vicinity of physical retail locations receive opportunities to engage in e-commerce, using their mobile communication devices, with merchants operating the physical retail locations. Various network entities may host different aspects of the e-commerce opportunities.

Certain activities associated with methods, systems, apparatuses, and articles of manufacture discussed herein include identifying a retail location proximate to a location of a mobile communication device operated by a consumer, and arranging for the establishment of a wireless communication session between the mobile communication device and a wireless network access node, which may be a node of a wireless local area network ("WLAN") or a wireless wide-area network ("WAN"). If the node via which the communication session is established is associated with a WLAN containing two or more access points, a location of the mobile communication device within a predefined service region of the WLAN is ascertained. The predefined service region may include one or more retail locations. For example, the predefined service region may be sub-divided into a number of physically or logically defined sub-regions corresponding to individual retail locations. An example of a predefined service region is a mall, which may include one or more physical retail locations and may have affiliated retailers without physical presences in the mall.

One activity occurring via the wireless communication session includes arranging for the consumer to receive information regarding a commodity that is available for transfer on behalf of the merchant entity. Another activity occurring via the wireless communication session is arranging for an exchange of consideration between the consumer and the merchant entity. In exchange for consideration from the consumer, the consumer receives the commodity. The commodity may be a commodity at a retail location or a digital commodity. Examples of digital commodities include but are not limited to digital media files (such as audio files, video files, text files, multimedia files, data files, playlists, metadata files, or streaming digital media content), redeemable electronic articles (such as coupons, certificates, or redeemable points), and wireless services.

In one scenario, a user interface associated with a particular retail location is presented to the consumer via the wireless communication session, and the consumer receives information regarding the commodity via the user interface. In this manner, the consumer has a "virtual retail experience" that complements his experience at or proximate to a particular physical retail location.

Certain virtual retail experiences can "follow" a consumer. For example, whenever a consumer visits a particular service region of a WLAN, aspects of the consumer's virtual retail experience(s) may be tracked and used to customize aspects of future virtual retail experiences. In another example, with a user's permission, a WAN may monitor the location of a mobile communication device for the purpose of presenting the user with e-commerce opportunities on behalf of nearby merchants, even when the mobile communication device is not near a predefined service region of a WLAN.

Consumer profiles represent one or more collections of information about consumers and/or the data consumers provide to, request from, use (or which is used) in connection with commerce with physical or virtual merchant entities. Consumer profiles may be used for various purposes, such as for identifying retail locations, customizing user interfaces, and forming affiliations between various parties desiring to extract value from e-commerce opportunities presented to consumers using the methods, systems, apparatuses, or articles of manufacture discussed herein.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DETAILED DESCRIPTION

Prior to turning to the drawings, an alphabetical list of certain terms and their definitions is provided. Other terms and their definitions are provided elsewhere in the Detailed Description section.

Advertisement. An Advertisement is any promotion of a product or service.

Commodity. A Commodity is something useful (for example, a tangible or intangible good or service) that can be turned into commercial or other advantage.

Consideration. Consideration is something of value given by one party to another in exchange for an act or promise.

Consumer. A Consumer is a person that acquires Commodities for personal use.

E-commerce. E-commerce is the exchange of Consideration for Commodities over a computer network.

Merchant Entity. A Merchant Entity is a person or business that operates a Retail Location, or on behalf of which a Retail Location is operated.

Mobile Communication Device. A Mobile Communication Device is any electronic device (or any physical or logical element of such an electronic device, either standing alone or included in other devices), which is configured for mobile wireless communication and which is responsive to a Consumer. A Mobile Communication Device is generally not a fixed-purpose device provided for specifically for use at a particular Retail Location, however.

Redeemable Article. A Redeemable Article is anything that is issued with the expectation of Redemption. A Redeemable Article can be used by a Consumer as Consideration in exchange for a Commodity transferred by or on behalf of a Merchant Entity. A Redeemable Article may also be a Commodity.

Redemption. Redemption is the process by which an article, such as a Redeemable Article, is taken back by or on behalf of the issuer of the article. One manner in which an article may be taken back is when the article is accepted by a Merchant Entity as Consideration in exchange for a Commodity.

Retail Location. A Retail Location represents premises (land, buildings, or portions thereof) at which a Merchant Entity accepts Consideration from Consumers for transferring Commodities.

Figure 1:
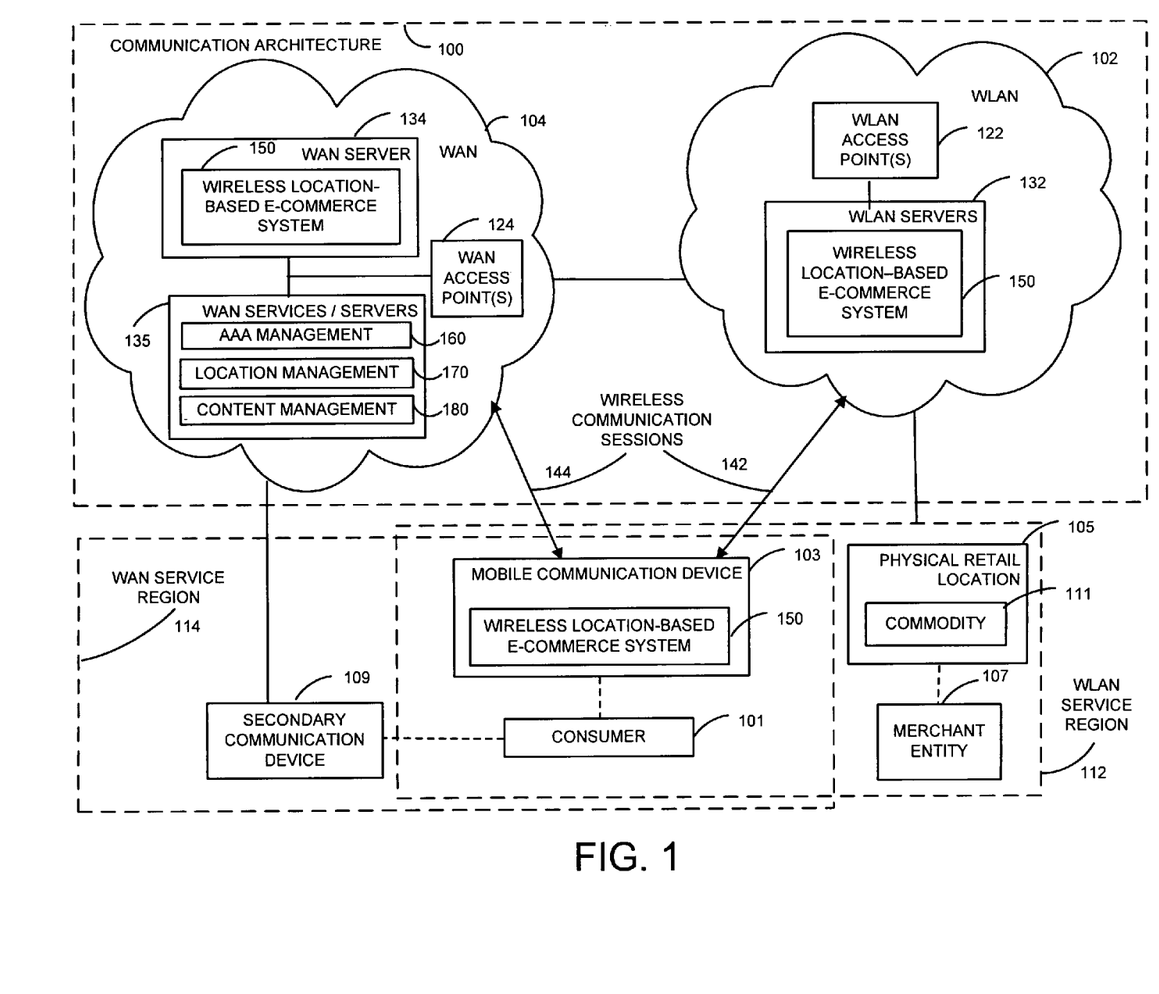
FIG. 1 is a simplified functional block diagram of a communication architecture via which a consumer operating a mobile communication device in the vicinity of a physical retail location receives opportunities to engage in wireless, location-based e-commerce with a merchant operating the physical retail location.

Turning to the drawings, where like numerals designate like components, FIG. 1 is a simplified functional block diagram of a communication architecture 100 via which a Consumer 101 operating a Mobile Communication Device 103 in the vicinity of a physical Retail Location 105 receives opportunities to engage in wireless, location-based E-commerce with a Merchant Entity 107 operating physical Retail Location 105.

Among other things, Mobile Communication Device 103 includes aspects of a wireless, location-based e-commerce system 150 (discussed further below, in connection with FIG. 2). A secondary communication device 109, also responsive to Consumer 101, is also shown and discussed further below. Secondary communication device 109 is any wired or wireless electronic device authorized for use by Consumer 101.

Communication architecture 100 includes a wireless local area network ("WLAN") 102 and a wide-area network ("WAN") 104. WLAN 102 represents one or more local wireless networks serving WLAN service region 112. WLAN service region 112 is a relatively small physical area (for example, up to a few hundred meters) within which wireless communications are established between nodes. A WLAN type is generally identified by the air interface protocol(s) used for communication between nodes therein. Currently popular WLAN air interface protocol(s) include the Wireless Fidelity ("WiFi") series of protocols promulgated by the Institute of Electrical and Electronics Engineers ("IEEE"). It will be appreciated, however, that any air interface protocol now known or later developed by be used for local communication. For example, local peer-to-peer communication protocols and techniques or cable replacement technologies such as Bluetooth may be used in conjunction with or in lieu of WLAN 102. It will be appreciated that the physical boundaries of WLAN service region 112 may be defined by dynamic parameters such as signal strength, access point location, and relationships between network operators, among other parameters.

A WLAN node is a processing location within WLAN 102 that has a unique address or identifier, such as a media access control ("MAC") address or an Internet Protocol ("IP") address. Nodes may be fixed or mobile. Examples of fixed nodes include WLAN access point(s) 122 (discussed further below) and WLAN server 132, which hosts aspects of wireless, location-based e-commerce system 150 (also discussed further below). An example of WLAN server 132 is a point-of-presence server operated in a particular hotspot. WLAN server 132 may implement local services, or may serve as a proxy for services offered remotely by third parties such as an operator of WAN 104 or a third-party network-based service provider. Examples of mobile nodes include communication devices operated by people within WLAN service region 112, such as Mobile Communication Device 103 operated by Consumer 101.

WAN 104 represents one or more wirelessly-accessed, dispersed networks covering one or more geographic regions of more than a few hundred meters. WAN 104 serves WAN service region 114, among other regions. WAN service region 114 is a physical area of any size within which wireless communications are established with WAN 104. It will be appreciated that the physical boundaries of WAN service region 114 may be defined by dynamic parameters such as signal strength, access point location, and relationships between network operators, among other parameters. As shown, WAN service region 114 partially overlaps WLAN service region 112. It will be appreciated that such overlap is not necessary, and that less or more overlap is possible.

WAN 104 may be a packet-switched network or a circuit-switched network (or a combination thereof), supporting communication between WAN nodes using various wired or wireless protocols. A packet-switched network routes packets of data between nodes of the WAN based on destination addresses of the equipment. The Internet is one example of a packet-switched WAN. In a circuit-switched network, a physical path or communication channel is dedicated to a connection between nodes. Examples of circuit-switched WANs are portions of the public switched telephone network ("PSTN") and radio frequency communication networks such as certain cellular or satellite communication networks.

A WAN node is a processing location within WAN 104 that has a unique address or identifier. WAN nodes may be fixed or mobile. An example of a mobile node is Mobile Communication Device 103. Examples of fixed nodes include WAN access point(s) 124 (discussed further below); WAN server 134, which hosts aspects of wireless, location-based e-commerce system 150 (also discussed further below); and WAN server(s) 135, which host other WAN services, such as authentication, authorization, and accounting ("AAA") management 160, location management 170, and content management 180. Examples of WAN servers 134 and 135 are application servers operated by WAN operator, or operated by third parties (such as an operator of WLAN 102 or third party network-based service providers) and proxied by WAN 104.

WLAN 102 is accessed via one or more WLAN access points 122 and WAN is accessed via one or more WAN access points 124. Access points 122 and 124 are physical or logical elements that provide points of entry into infrastructure or services associated with WLAN 102 and WAN 104, respectively. In particular, WLAN access points 122 are used for establishing wireless communication session 142 between Mobile Communication Device 103 and one or more nodes of WLAN 102, and WAN access points 124 are used for establishing wireless communication session 144 between Mobile Communication Device 103 and one or more nodes of WAN 104. Internal arrangements, architectures and principles of operation of access points are well known. Although discrete access points 122 and 124 are shown, it will be appreciated that a single access point may serve as both a WLAN access point and as a WAN access point in a particular geographic area.

Wireless communication session 142 represents any wireless, local, physical or virtual connection between a node of WLAN 102 and Mobile Communication Device 103 established for wireless, location-based e-commerce as discussed herein. Wireless communication session 144 represents any wireless, physical or virtual connection between a node of WAN 104 and Mobile Communication Device 103 established for wireless, location-based e-commerce as discussed herein.

Figure 2:
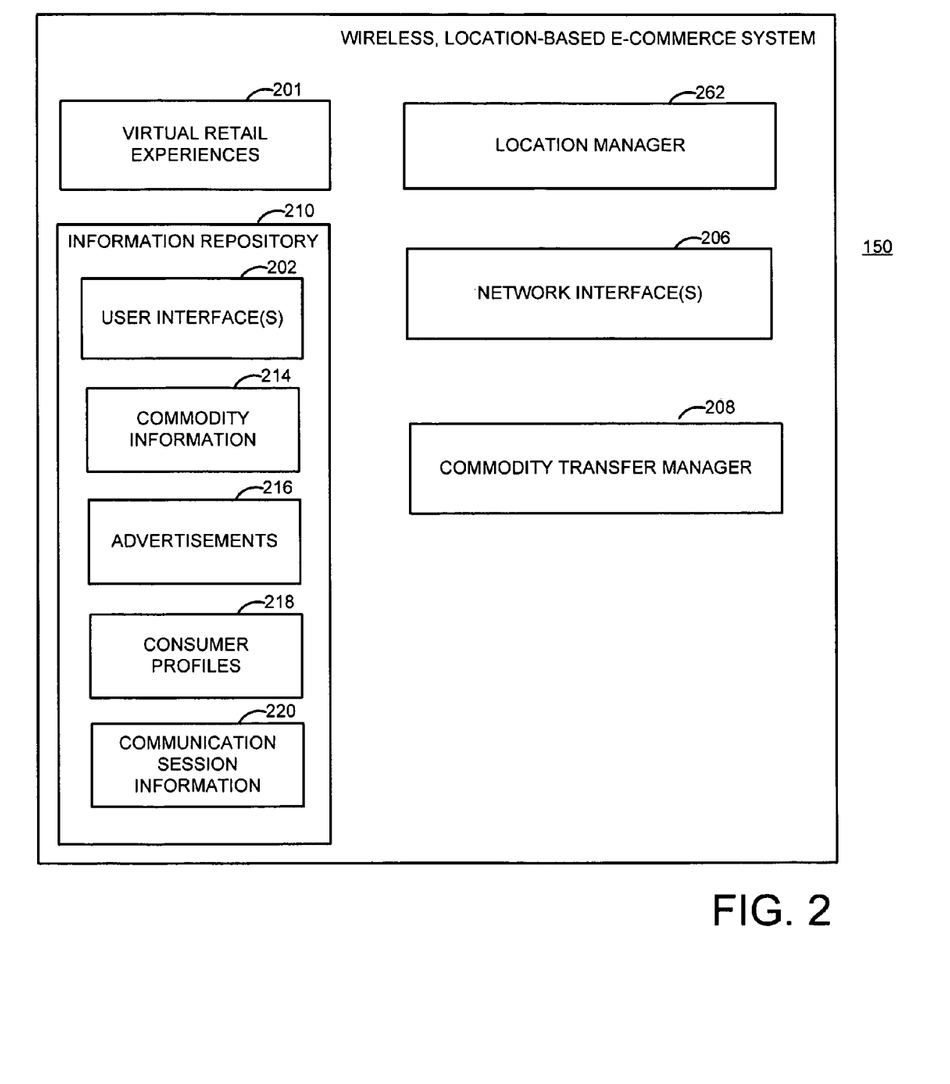
FIG. 2 is a simplified functional block diagram of a wireless, location-based e-commerce system configured for operation with aspects of the communication architecture and mobile communication device shown in FIG. 1.

With continuing reference to FIG. 1, FIG. 2 is a simplified functional block diagram of wireless, location-based e-commerce system (referred to for discussion purposes as "Virtual Retail System") 150, aspects of which are usable with Mobile Communication Device 103 and one or more networked servers within communication architecture 100 to present Consumer 101 with opportunities to engage in E-commerce with a merchant entity 107 when Mobile Communication Device 103 is in the vicinity of physical Retail Location 105.

Virtual Retail System 150 includes one or more virtual retail experiences 201; network interface(s) 206; a location manager 262; a commodity transfer manager 208; and an information repository 210, which further includes information regarding commodity information 214, Advertisements 216, consumer profile(s) 218, and communication session information 220. Key to the implementation of Virtual Retail System 150 is a common set of network-facing methods for accessing the different components that implement functions just described. These methods may include, but are not limited to, models and/or protocols for communicating with network-based services. Corresponding methods and/or protocols are also implemented by Mobile Communication Device 103 to enable it to communicate with Virtual Retail System 150. It is to be appreciated that neither Virtual Retail System 150 nor Mobile Communication Device 103 are specially configured for communication with each other through proprietary means, rather communication is through mutually agreed upon sets of methods and/or protocols. Mobile Communication Device 103 is thereby enabled to communicate with any number of virtual retail experiences 201 built according to the standards of Virtual Retail System 150. In general, design choices dictate how specific functions of Virtual Retail System 150 are implemented. Such functions may be implemented using hardware, software, firmware, or combinations thereof.

Virtual retail experiences 201 represent the manners in which E-commerce is conducted between Consumers and Merchant Entities operating physical Retail Locations and hosting aspects of Virtual Retail Systems 150. One possible implementation of virtual retail experiences 201 are user interface(s) 202 (which may be stored by Mobile Communication Device 103, WLAN 102, or WAN 104) presented by Mobile Communication Device 103. It will be appreciated, however, that configuration and use of Virtual Retail System 150 is not dependent on any particular implementation of virtual retail experiences 201.

In one implementation, each individual Merchant Entity has a unique virtual retail experience 201 associated therewith. As such, Merchant Entities (for example, a number of warehouse-style electronic stores) in different Retail Locations may share the same virtual retail experience 201. In another implementation, individual physical Retail Locations may have unique virtual retail experiences. In a further implementation, virtual retail experiences 201 may be associated with predefined service regions of WLANs, such as WLAN service region 112. The predefined service region may include one or more Retail Locations. For example, the WLAN service region 112 may be sub-divided into a number of physically or logically defined sub-regions corresponding to individual Retail Locations. One or more of such Retail Locations may share, or be accessed via, the same virtual retail experience 201, or virtual retail experiences associated with a number of Retail Locations may be grouped together. Examples of predefined service regions include but are not limited to stores, malls, airports, cafes, city blocks, movie theaters, museums, theme parks, and performance venues. Examples of sub-regions corresponding to individual Retail Locations include individual stores or departments thereof, and areas at which common Commodities or activities are aggregated. In a still further implementation, a generic virtual retail experience may be used in a standard manner for E-commerce between a Consumer and multiple Merchant Entities/physical Retail Locations. It will be appreciated that while WLAN and WAN access nodes are generally fixed in a particular location, services, such as services associated with Virtual Retail System 150, may be hosted in many physical or virtual locations.

Network interface(s) 206 represent one or more physical or logical elements, such as connectivity devices or computer-executable instructions, that enable wireless communication (via communication sessions 142 or 144, for example) between Mobile Communication Device 103 and a network (such as WLAN 102 or WAN 104) using one or more protocols or techniques. Information received at a given network interface may traverse one or more of the seven vertical layers of the OSI Internetworking Model: layer 1, the physical layer; layer 2, the data link layer; layer 3, the network layer; layer 4, the transport layer; layer 5, the session layer; layer 6, the presentation layer; and layer 7, the application layer.

Location manager 262 is responsible for ascertaining locations of Mobile Communication Device 103 and identifying one or more physical Retail Locations 105 to which Mobile Communication Device 103 is proximate. Location manager 262 may also handle certain aspects of establishing communication sessions 142 or 144 via network interface(s) 206. More specifically, location manager 262 ascertains whether Virtual Retail System 150 is configured for operation in a service region in which Mobile Communication Device 103 is disposed, and identifies the network hosting Virtual Retail System 150. Based on the location of Mobile Communication Device 103 within a particular service region, location manager 262 identifies one or more physical Retail Locations 105 to which Mobile Communication Device 103 is proximate and/or identifies the Consumer's preferred virtual retail experience(s) 201 associated with the physical Retail Locations 105. In one example, if a WLAN service region (for example, a WiFi hotspot) that hosts a Virtual Retail System 150 is accessible to Mobile Communication Device 103, location manager 262 may identify one or more physical Retail Locations 105 within the WLAN service region. As such, the proximity of the Mobile Communication Device to the WLAN service region is ascertained, as well as optionally the relationship of the Mobile Communication Device to fixed locations within the service region. In another example, if a WAN service region (for example, a cellular service) that hosts a Virtual Retail System 150 is accessible to Mobile Communication Device 103, location manager 262 may identify one or more nearby physical Retail Locations 105 using geocoding coupled with consumer profiling. The case of the WAN service region is illustrated by a mobile phone user on a car trip. Because the user has authorized his location to be tracked (via a cellular service, for example), location manager 262 can detect that the user is in the vicinity (however vicinity is defined, perhaps six miles or sixty miles or any other physical or logical definition desired) of an affiliated service and can notify the user of a promotion at the affiliated location using a means other than WLAN, such as short-messaging service, text messaging, or any other known or future wireless communication facility. These and other aspects of the operation of location manager 262 are discussed further below, in connection with FIG. 3.

Commodity transfer manager 208 is configured to implement certain aspects of an E-commerce transaction between Consumer 101 and merchant entity 107 when Mobile Communication Device 103 is proximate to a selected physical Retail Location 105 operated by merchant entity 107. More specifically, commodity transfer manager 208 handles: distribution of commodity information 214, which is information regarding Commodities that are available for transfer to the Consumer on behalf of the Merchant Entity; exchanges of Consideration between the Consumer and the Merchant Entity for Commodities; and (optionally) transfer of certain digital Commodities to a communication device selected by Consumer 101 (such as Mobile Communication Device 103 or secondary communication device 109). Commodity transfer manager 208 may also handle certain aspects of establishing communication sessions 142 or 144 via network interface (s) 206. As such, commodity transfer manager 208 generally implements one or more features of a service for identifying, enumerating and exchanging objects over a network. Aspects of the operation of commodity transfer manager 208 are discussed further below, in connection with FIG. 3.

Information repository 210 represents general data storage capability for information relating to E-commerce transactions conducted using Virtual Retail System 150. Information repository 210 may be implemented using various types and arrangements of computer-readable media 404 (discussed further below, in connection with FIG. 4) within Mobile Communication Device 103, WLAN 102, or WAN 104. Information storable within information repository 210 includes but is not limited to information used to implement virtual retail experiences 201, such as user interfaces 202; commodity information 214; Advertisements 216; consumer profile(s) 218; and communication session information 220.

User interfaces 202 represent displays and/or controls that implement one or more virtual retail experiences 201 on Mobile Communication Device 103. Displays are used to receive input from, or provide output to, a Consumer. An example of a physical display is a monitor device. An example of a logical display is a data organization technique (for example, a window, a menu, or a layout thereof). Controls facilitate the receipt of input from a Consumer. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a Consumer may issue commands. It will be appreciated that the same physical device or logical construct may function as an interface for both inputs to, and outputs from, a Consumer.

Commodity information 214 represents information about Commodities available for transfer to Consumers on behalf of merchant entities. Examples of Commodities include Commodities transferable at Retail Locations, and digital Commodities. Examples of digital Commodities include but are not limited to: digital media items (for example, audio files, image files, video files, text files, multimedia files, data files, playlists, metadata, and streaming media); network services (such as Internet access, email access, and the like); and Redeemable Articles such as coupons, certificates, or redeemable points or other rewards. Digital Commodities may be in any format now known or later developed, such as portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), extensible HTML ("XHTML"), MP3, WAV, WMA, WMV, ASF, or any format via which digital content may be provided in real-time or streamed. It will be appreciated that Commodities may be tangible or intangible, and may have more than one element. One example of an intangible Commodity is a license, such as a license to use software or to play a music file.

Advertisements 216 represent any promotion of a product or service presentable via a Mobile Communication Device, in any format. In the context of Virtual Retail System 150, Advertisements 216 may be presented by or on behalf of any party, including (but not necessarily) a particular Merchant Entity. Advertisements may be provided via Virtual Retail System 150, stored on Mobile Communication Device 103, and/or obtained from one or more third parties. Advertisements may be general advertisements or directed advertisements. General advertisements are created to appeal to a generally wide audience (for example, the general public or some portion thereof). Directed advertisements, also referred to as targeted advertisements, are designed to appeal specifically to a particular segment of the population. Some types of directed advertisements, often referred to as customized advertisements, are designed to reach specific individuals or groups of individuals.

Consumer profiles 218 represent one or more collections of information about a Consumer and the data the Consumer provides to, requests from, or uses/is used in connection with commerce with physical or virtual merchant entities. As such, certain information within consumer profiles 218 may be received directly from a Consumer, such as Consumer 101. For example, Consumer 101 may input data into Mobile Communication Device 103 or supply data to a Merchant Entity at a physical Retail Location (such as by completing a survey or by using a membership card at the Retail Location). Other information within consumer profiles 218 may be collected based on E-commerce activities or other behaviors of the Consumer. For example, certain communication session information 220 (discussed further below) may be included in consumer profiles 218. Consumer profile(s) 218 may be used for any purpose within Virtual Retail System 150, and are especially useful for customizing operation of Virtual Retail System 150 for particular Consumers. To address privacy concerns, the Consumer may have control over whether and/or which information is collected and included in consumer profile(s) 218, and may also have control over how or by whom such information is used or accessed. Consumer profile(s) 218 are discussed further below, in connection with various aspects of the method sequence chart of FIG. 3.

Communication session information 220 represents pertinent information about E-commerce transactions completed using Virtual Retail System 150 (such as parties involved, commodity information 214 transferred, locations where the transactions occurred, and the like). Communication session information 220 may be used by Consumer 101, Mobile Communication Device 103, or networks hosting aspects of Virtual Retail Systems for various purposes, such as for updating consumer profile(s) 218.

Figure 3:
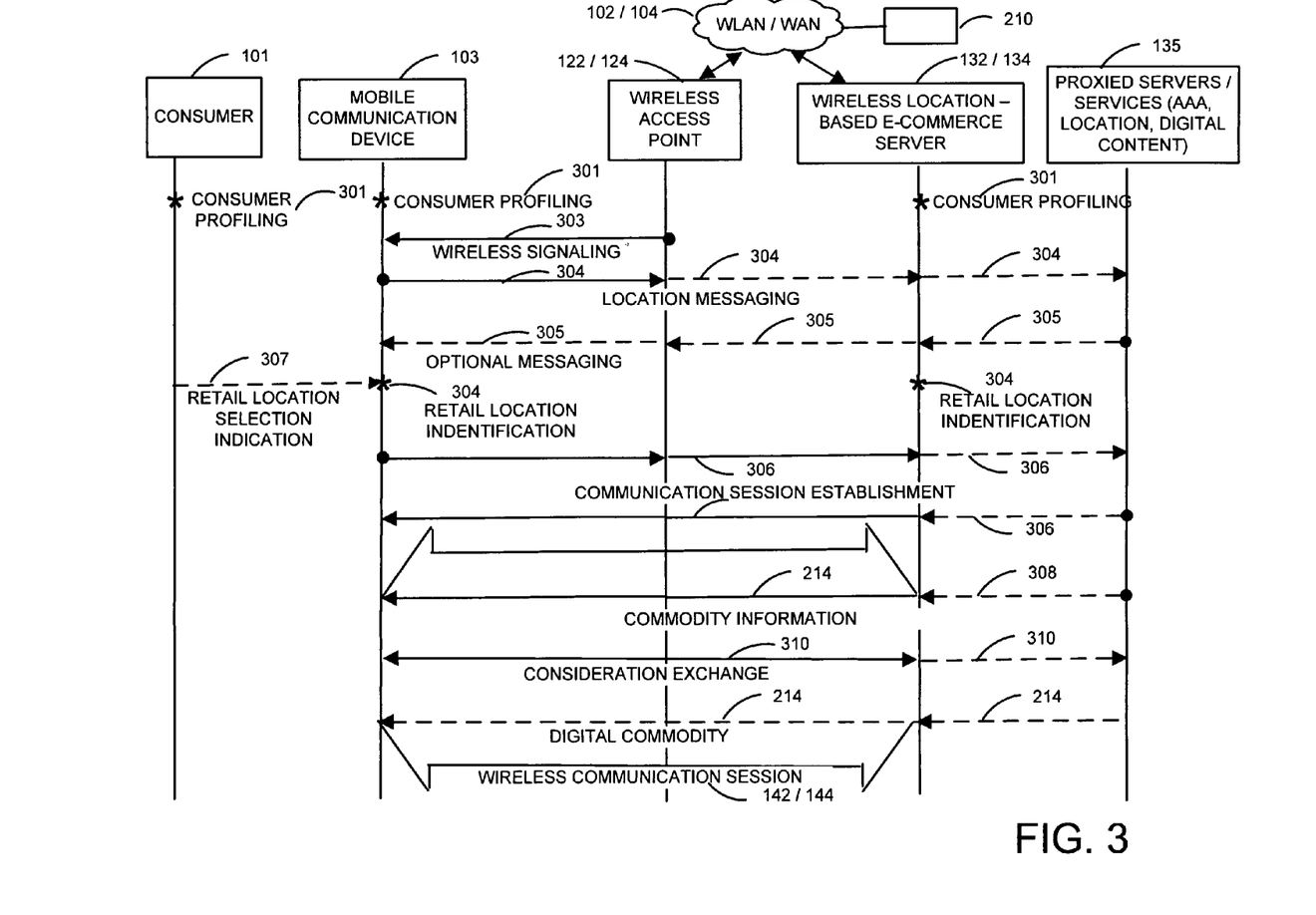
FIG. 3 is a message sequence chart illustrating certain aspects of a wireless, location-based e-commerce method performed by aspects of the system shown in FIG. 2.

With continuing reference to FIGS. 1 and 2, FIG. 3 is a message sequence chart illustrating certain aspects of a method for a wireless, location-based E-commerce. Aspects of the method are usable with Mobile Communication Device 103 and one or more networked servers within communication architecture 100 (such as WLAN server 132 or WAN servers 134 or 135) to present Consumer 101 with opportunities to engage in E-commerce with merchant entity 107—via one or more virtual retail experiences 201—when Mobile Communication Device 103 is in the vicinity of a particular physical Retail Location 105. The method(s) illustrated in FIG. 3 may be implemented using computer-executable instructions executed by one or more general, multi-purpose, or single-purpose processors (exemplary computer-executable instructions 406 and processor 402 are discussed further below, in connection with FIG. 4). Method steps involving "arranging for" a particular act to occur include both client-side acts and network-side acts. Unless specifically stated, the methods described herein are not constrained to a particular order or sequence. In addition, some of the described method or elements thereof can occur or be performed concurrently. It will also be understood that all of the described messaging need not occur in each E-commerce transaction, and the type, quantity, and implementation of specific messaging is a matter of implementation preference. For example, dotted-line messaging is generally optional and/or may not occur in each E-commerce transaction (based on whether Virtual Retail System 150 is hosted by WLAN 102 or WAN 104, for example).

For exemplary purposes, two E-commerce transactions are discussed-one using a sports retailer as an example, and another using an electronics warehouse store that offers music and other digital goods for download via a Virtual Retail System 150. It is assumed that Mobile Communication Device 103 possesses or has acquired an IP address usable for communication within WLAN 102 and/or WAN 104. The exemplary E-commerce transaction involves a Consumer (referred to as "Bob") carrying a dual-mode WLAN-enabled/cellular mobile phone in the vicinity of a WiFi hotspot within which a large electronics store is located. A Virtual Retail System 150 is hosted by a WLAN access point 122 (or other network node, such as WLAN server 132) on behalf of the electronics store. Bob is authorized to use his cellular service in and around the electronics store, and a Virtual Retail System 150 with which the electronics store is affiliated is hosted by an entity outside of the WLAN (for example, by a network-based music service, a wireless service provider such as Boingo Wireless, or even the Merchant Entity associated with the electronics store).

Initially, consumer profiling 301 is discussed. Consumer profiling 301 represents acts (performed by Consumer 101, Mobile Communication Device 103, WLAN 102, or WAN 104 at any step of the method illustrated in FIG. 3) associated with creating, updating, or using consumer profiles 218. Examples of consumer profiling 301 include but are not limited to acts regarding collecting or using a Consumer's: purchasing patterns; personal information (for example, name, address, gender, and age); service profiles (whether a user has opted-in to participation wireless, location-based E-commerce transactions, for example, and opt-in conditions, if any); Retail Location affiliations; device- and network-gathered location information; device- and network-gathered communication session information 220; and other behavior-related data, such as Internet activities, e-mail activities, general travel patterns, and the like.

Bob, for example, has developed a strong affiliation with a large chain of sporting goods stores, and the Merchant Entity associated with the sporting goods stores is generally familiar with Bob's interests—Bob has filled out surveys at the sporting goods stores, and he uses a membership card for in-store purchases. Bob also frequently visits a Virtual Retail System 150/virtual retail experience 201 hosted on behalf of a sporting goods store in a local WiFi hotspot, and he has agreed to allow the Merchant Entity associated with the sporting goods stores to determine his location via his cellular service and to offer promotional Commodities based on his current location. The Merchant Entity associated with the sporting goods stores has constructed a consumer profile 218 associated with Bob. The consumer profile includes information obtained from the surveys, membership card use, E-commerce transactions conducted within the local WiFi hotspot, and Bob's whereabouts obtained via his cellular service. In one example of consumer profiling 301, the Merchant Entity associated with the sporting goods stores uses Bob's consumer profile to infer that he is interested in kayaking, and promotes an affiliation with a kayak rental company it identifies as located in the strip mall adjacent to the electronics store. A WiFi hotspot is not accessible in the vicinity of the kayak rental company. In addition, Bob's location near the kayak rental company and the associated demographics compiled by the Merchant Entity associated with the sporting goods stores make him a candidate to receive a targeted Advertisement 216 for a kayak adventure vacation. Note that while there is no specific Virtual Retail System 150 within the local vicinity capable of completing the necessary E-commerce transaction to purchase the kayak adventure vacation, Bob's consideration of the opportunity enabled a transaction between the kayak rental company and the adventure vacation service.

Referring to message sequence chart of FIG. 3, the exemplary E-commerce transaction begins when the presence or location of Mobile Communication Device 103 is ascertained within WLAN 102 or WAN 104. The presence or location of Mobile Communication Device 103 may be ascertained on a periodic basis. It will be appreciated that any suitable signaling model may be used to ascertain the presence or location of Mobile Communication Device 103. For exemplary purposes, however, wireless signaling 303 and/or Mobile Communication Device location messaging 304 are discussed. In general, wireless signaling 303 received by Mobile Communication Device 103 is used directly or indirectly to ascertain the presence or location of Mobile Communication Device 103. Wireless signaling 303 is any wireless signal transmitted using any suitable protocol by or on behalf of a wireless network for the purpose of indicating the presence of the wireless network and/or the availability of certain wireless services within regions served by the wireless network. In one example, wireless signaling 303 is a general-purpose beacon or other message transmitted by WLAN wireless access point(s) 122 or WAN access point(s) 124 to indicate the presence of WLAN 102 or WAN 104. In another example, wireless signaling 303 is a special-purpose beacon or other message transmitted by WLAN wireless access point(s) 122 or WAN access point(s) 124 to indicate the availability of services associated with Virtual Retail System 150 hosted by WLAN 102 or WAN 104. If Mobile Communication Device 103 is in a region served by both WLAN 102 and WAN 104 offering services associated with Virtual Retail System 150, it is generally a matter of design choice which network will host the services. For example, when Bob is in the electronics store, the feature of Bob's mobile phone that implements Virtual Retail System 150 may be configured (via consumer profiling 301, for example) to first identify proximate Retail Locations within WLAN service area 112, and secondarily to identify proximate Retail Locations within WAN service area 114, or vice-versa.

In response to wireless signaling 303, Mobile Communication Device 103 transmits location messaging 304 to wireless network access point 122 or 124. Location messaging 304 is any wireless signal transmitted using any suitable protocol by or on behalf of Mobile Communication Device 103 for the purpose of indicating the presence and/or location of Mobile Communication Device 103 to a wireless network.

In one implementation, wireless signaling 303 is used directly by Mobile Communication Device 103 to ascertain its location, and mobile communication device location messaging 304 is used to communicate the location of Mobile Communication Device 103 to WLAN 102 or WAN 104. In this implementation, Mobile Communication Device 103 is equipped with a location sensor, such as a global positioning system ("GPS") receiver another type of signal receiver, which is configured to use wireless signaling 303 to ascertain the location of Mobile Communication Device 103. For example, information such as GPS coordinates, received signal strengths, received signal times, and signal transmitter identifiers, may be analyzed by Mobile Communication Device 103 to ascertain its own location. Various now known or later developed techniques for ascertaining location based on information received from a location sensor may be used, such as global positioning system data analysis, triangulation analysis, time-distance-of-arrival analysis, and signal strength analysis.

In another implementation, Mobile Communication Device 103 discovers wireless signaling 303, responds to wireless signaling 303 via communication device location messaging 304, and the identity and location of Mobile Communication Device 103 is ascertained by WLAN 102 and/or WAN 104 in response to mobile communication device location message 304. If Mobile Communication Device 103 is within WLAN service region 112, WLAN access point 122 may receive location messaging 304 in response to wireless signaling 303, and forward relevant information to Virtual Retail System 150 hosted or proxied by WLAN server 132. If Mobile Communication Device 103 is within WAN service region 114 WAN access point 124, may receive location messaging 304, and forward relevant information to Virtual Retail System 150 hosted or proxied by WAN servers 134 or 135 and/or special-purpose services, such as location management service 170.

For example, location manager 262 within WLAN 102 or WAN 104 may receive information from mobile communication device location messaging 304 (such as GPS coordinates, signal strengths, messaging information, signal arrival times, or signal transmitter identifiers from a particular access point or access points) and analyze such information to ascertain the location of Mobile Communication Device 103. Various now known or later developed techniques for ascertaining location based on information received from a location sensor may be used, such as global positioning system data analysis, triangulation analysis, time-distance-of-arrival analysis, and signal strength analysis.

It will be appreciated that it may be desirable to locate Mobile Communication Device 103 within various sub-regions of particular service regions. For example, WLAN service region 112 may cover a relatively large physical region such as a store, a mall, an airport, a café, a city block, a movie theatre, a museum, a theme park, or a performance venue, among other regions. The physical region may be sub-divided into a number of physically or logically defined sub-regions corresponding to individual Retail Locations (operated by the same or different merchant entities), such as departments, stores, and areas at which common Commodities or activities are aggregated. In some cases, such sub-regions may be considered to be separate Retail Locations having separate virtual retail experiences 201 associated therewith. In the context of Bob's exemplary E-commerce transaction, the electronics store may be sub-divided into areas such as product sales areas, food service/sales areas, and Internet access/seating areas.

Referring again to FIG. 3, the location of Mobile Communication Device 103 may be communicated, via optional messaging 305, back to Mobile Communication Device 103. Optional messaging 305 represents signaling used, as necessary or desired, to communicate the location of Mobile Communication Device 103 back to entities hosting aspects of Virtual Retail System 150.

Next, Retail Location identification 304 is performed. Retail location identification 304 represents acts associated with identifying particular Retail Locations 105 offering virtual retail experiences 201 that are proximate to the location of Mobile Communication Device 103. Retail location identification may be performed by Mobile Communication Device 103 and/or network nodes associated with WLAN 102 or WAN 104 (such as WLAN server 132 or WAN servers 134 or 135) that host or proxy aspects of Virtual Retail System 150.

One circumstance under which Mobile Communication Device 103 and particular Retail Locations 105 may be deemed to be in proximity is when Mobile Communication Device 103 and particular Retail Location(s) 105 are within a certain physical distance from each other. In the case of boundaries of WLAN service region 112, boundaries of WLAN service region 112 (or sub-regions thereof) may provide the limits of the physical distance. For example, whenever the location of Mobile Communication Device 103 is ascertained to be within WLAN service region 112 or a sub-region thereof, proximity would be deemed to exist. In the case of WAN service region 114, the location of Mobile Communication Device 103 relative to a predetermined physical Retail Location or sub-region thereof may be determined and evaluated to determine proximity.

Consumer profiling 301 may be used to establish other circumstances affecting proximity. For example, certain logical relationships between Consumer 101 and physical Retail Locations 105 may be created and stored within consumer profiles 218, and may be used alone, or as filters in conjunction with certain physical distances, to determine when Mobile Communication Device 103 is proximate to a particular Retail Location. In one scenario, a Retail Location is identified based on an affiliation of the Retail Location with a Retail Location previously visited by Consumer 101. For example, the Consumer's interests may have been obtained or inferred from previous activities associated with Virtual Retail System 150, and merchant entities may have formed affiliations based on such activities. In the example of consumer profiling 301 referred to above, Bob's consumer profile is used to infer that he is interested in kayaking, and the Merchant Entity associated with the sporting goods stores promotes an affiliation with a kayak rental company located in the strip mall adjacent to the electronics store. In this manner, certain virtual retail experiences can "follow" Bob even when he is not near a service region of a WLAN hosted by a sporting goods store.

Acts associated with Retail Location identification 304 may be performed automatically, manually, or a combination thereof. In a generally manual implementation, one or more virtual retail experiences 201 are presented via a user interface on Mobile Communication Device 103 as being associated with proximate physical Retail Locations (based on the proximity of Mobile Communication Device 103 to particular Retail Locations within predefined service regions or sub-regions thereof), and Consumer 101 manually selects (via retail location selection indication 307) the desired virtual retail experience. As the Consumer moves, virtual retail experience options may change. In a more automated implementation, consumer profiling 301 may be performed to filter one or more virtual retail experiences 201 presented to Consumer 101 by communication device 103 and/or a network node hosting Virtual Retail System 150. In a fully automated implementation, Consumer 101 does not have real-time participation in retail location identification 304—based on consumer profiling 301, one or more virtual retail experiences 201 are automatically selected and presented to Consumer 101.

In the context of Bob's exemplary E-commerce transaction, if Bob is in the electronics store operating the feature on his mobile phone that implements Virtual Retail System 150 in "manual" mode, the mobile phone may alert him (via vibration, ringing, or in another manner, such as via a messaging service such as a text messaging service, a short messaging service, or a voicemail) that the mobile phone has identified the electronics store and one or more Retail Locations therein (such as the product sales area, food service/sales area, or Internet access/seating area) as being proximate to his current location. One or more references to virtual retail experiences 201 associated with the electronics store may appear on Bob's user interface, and Bob may indicate whether he would like to select a particular virtual retail experience. If Bob is operating his mobile phone in "automatic" mode, Bob may or may not be alerted that the mobile phone has identified one or more virtual retail experiences 201 associated with the electronics store.

Referring again to FIG. 3, communication session establishment 306 involves arranging for the establishment of wireless communication session 142 or 144 between Mobile Communication Device 103 and a node of WLAN 102 or a node of WAN 104, respectively. For example, location manager 262 and/or commodity transfer manager 208 within Mobile Communication Device 103, WLAN 102, and/or WAN 104 may use network interface(s) 206 to establish wireless communication session 142 or 144. It should be noted that communication session establishment 306 may be deemed to have occurred whenever Mobile Communication Device 103 and a network-hosted Virtual Retail System 150 are able to discover each other. In general, however, communication establishment 306 involves additional steps relating to establishing a level of trust between Mobile Communication Device 103 and WLAN 102 or WAN 104. Establishing such a level of trust is generally desirable because the nature of wireless E-commerce has the potential to broadcast private and/or commercially-valuable information to virtually unknown entities.

In one implementation, communication session establishment 306 involves the performance of security-related authentication, authorization, and accounting ("AAA") activities by WLAN 102 and/or WAN 104 (such as by parties providing AAA management service 160) to establish wireless communication session 142 or 144. Authentication is the process of identifying a user. Users may be identified using any now known or later developed information or technique, such as e-mail address, cell phone number, or more complex information or techniques. Authorization is the process of enforcing policies relating to what types of qualities of activities, resources, or services the user is permitted to access. Authentication may also encompass the authorization process. Accounting measures the resources a user accesses during a particular distribution transaction.

AAA activities associated with communication session establishment 306 may be similar to those that have been defined and standardized by the Internet Engineering Task Force ("IETF"), although specific types, amounts, and implementation of AAA activities is a matter of design choice. Some examples of security-related AAA activities are key exchanges and "shared secret" solutions.

Once wireless communication session 142 or 144 has been established, it is arranged for Mobile Communication Device 103 to receive commodity information 214 via wireless communication session 142 or 144. For example, commodity transfer manager 208 within Mobile Communication Device 103, WLAN 102, and/or WAN 104 may arrange for Mobile Communication Device 103 to receive commodity information 214. Commodity information 214 is transmitted for the purpose of notifying Consumer 101 of the availability of a Commodity for transfer on behalf of a particular Merchant Entity via communication session 142 or 144. Commodity information 214 may be transmitted via any wireless signal using any suitable protocol.

Commodity information 214 is generally presented to Consumer 101 via a particular virtual retail experience 201/user interface 202 associated with a selected proximate Retail Location 105. User interfaces 202 associated with particular virtual retail experiences 201 are represented and/or stored within information repositories 210 at Mobile Communication Device 103 and/or network nodes hosting aspects of Virtual Retail System 150. In the case where network node hosting aspects of Virtual Retail System 150 deliver virtual retail experience 201/user interface(s) 202 to Mobile Communication Device 103, a mechanism such as HTML-style web pages, XML-based presentation models, or any other suitable mechanism or technique that allows a user to browse the contents of a particular service may be used. Consumer profiling 301 may be used to customize commodity information 214.

In the context of Bob's exemplary E-commerce transaction, Bob selected a virtual retail experience associated with the product sales area of the electronics store. Bob received information about digital content files available for download on behalf of the electronics store via a customized user interface presented by his mobile phone. First, Bob was directed to some pre-programmed music content in the form of playlists or streaming audio. Bob was able to browse a catalog of available content based on traditional media library metadata (such as artist name, album name, genre, and the like), and also based on activity-specific classification criteria (such as kayaking, camping, skiing, bicycle riding, and the like). Bob was also directed to other forms of digital media, such as images and video clips, as well as web pages on various topics.

Referring again to FIG. 3, next, via communication session 142 or 144, Consideration exchange is arranged between Consumer 101 and the particular Merchant Entity providing the selected virtual retail experience 201 (or another affiliated Merchant Entity). Examples of Consideration from the Consumer include but are not limited to promises to pay money (directly or indirectly, such as via cash, credit, or any type of account charge), the Redemption of a Redeemable Article (such as a certificate, points, or making an identity-based claim), or promises to perform services (such as receiving advertising). In exchange for his Consideration, the Consumer receives a Commodity. For example, the Consumer may receive a selected digital Commodity or the transfer of a Commodity associated with the Retail Location (such as a Commodity transferred at the Retail Location, or a coupon for a discount on such a Commodity), or both. Any suitable now known or later developed file transfer protocols or techniques may be used to accomplish distribution of digital Commodities via wireless communication session 142 or 144. In one implementation, consumer profiling 301 may be used to identify secondary communication device 109, and the selected digital Commodity may be distributed to secondary communication device 109. It will be appreciated that third-party content management services, such as content management services 180, may handle aspects of delivering digital Commodities.

In the context of Bob's E-commerce transaction, the electronics store had tracked Bob's whereabouts using signal strength analysis while Bob was traveling around the store. The Merchant Entity associated with the electronics store decided that whenever Bob spent more than five minutes in a particular area, an inference could be drawn about Bob's interests. It was proposed that Bob's Consideration for downloading certain music could be met by viewing advertising, which was selected based on what was inferred about Bob's interests based on his locations within the store. Bob had earlier requested that all music files downloaded from the electronic store's virtual retail experience be transmitted to his home computer, which had been previously authenticated and authorized for receiving such files. The Merchant Entity associated with the electronics store contracted with a third party music retailer to support music downloads, but billing was through Bob's cellular provider. In addition, since it was the fifth time Bob conducted E-commerce via the electronics store's virtual retail experience, Bob received a coupon for a free latte via the E-commerce transaction. Bob redeemed the latte coupon, and left the electronics store. Bob's cellular service provider followed his location on behalf of the Merchant Entity associated with the sporting goods stores, and as Bob approached the kayak rental store, his mobile phone alerted him to a coupon for a free kayak rental.

The wireless, location-based E-commerce systems and techniques described herein enable users of Mobile Communication Devices in the vicinity of physical Retail Locations to receive specific opportunities to engage in E-commerce, using their Mobile Communication Devices, with merchants operating the physical Retail Locations. User interfaces associated with particular Retail Locations/merchant entities provide information regarding Commodities available on behalf of the merchant entities, thus providing the Consumer with "virtual retail experiences" that complement his experiences at or proximate to the physical Retail Locations. Users are presented with abundant, flexible, options for customization and control of discovery and virtual retail experiences. From a network and/or Merchant Entity perspective, affiliations may be formed between various parties desiring to extract value from E-commerce opportunities presented to Consumers using the methods, systems, apparatuses, or articles of manufacture discussed herein. Retail locations may form profitable business relationships with third parties, and Consumer relationships may be managed by one Merchant Entity but leveraged by many affiliated merchant entities.

With continued reference to FIGS. 1-3, FIG. 4 is a block diagram of an exemplary configuration of an operating environment 400 in which all or part of Virtual Retail System 150 and/or the methods shown and discussed in connection with FIG. 3 may be implemented or used. Operating environment 400 is generally indicative of a wide variety of general-purpose or special-purpose computing environments, and is not intended to suggest any limitation as to the scope of use or functionality of the system(s) and methods described herein. For example, operating environment 400 may be a Mobile Communication Device such as a portable digital media player, a personal digital assistant, a vehicle-mounted device, or a mobile phone, or any other type of mobile device now known or later developed. Operating environment 400 may also be any type of computer, such as a personal computer, a workstation, a server, a portable device, a wearable computer, a laptop, a tablet, or any other type of computer, or any aspect thereof. Such a computer may function as a Mobile Communication Device, or may be part of a distributing computing network such as WLAN 102 or WAN 104, and may be used to implement or host a web service in whole or in part.

Figure 4:
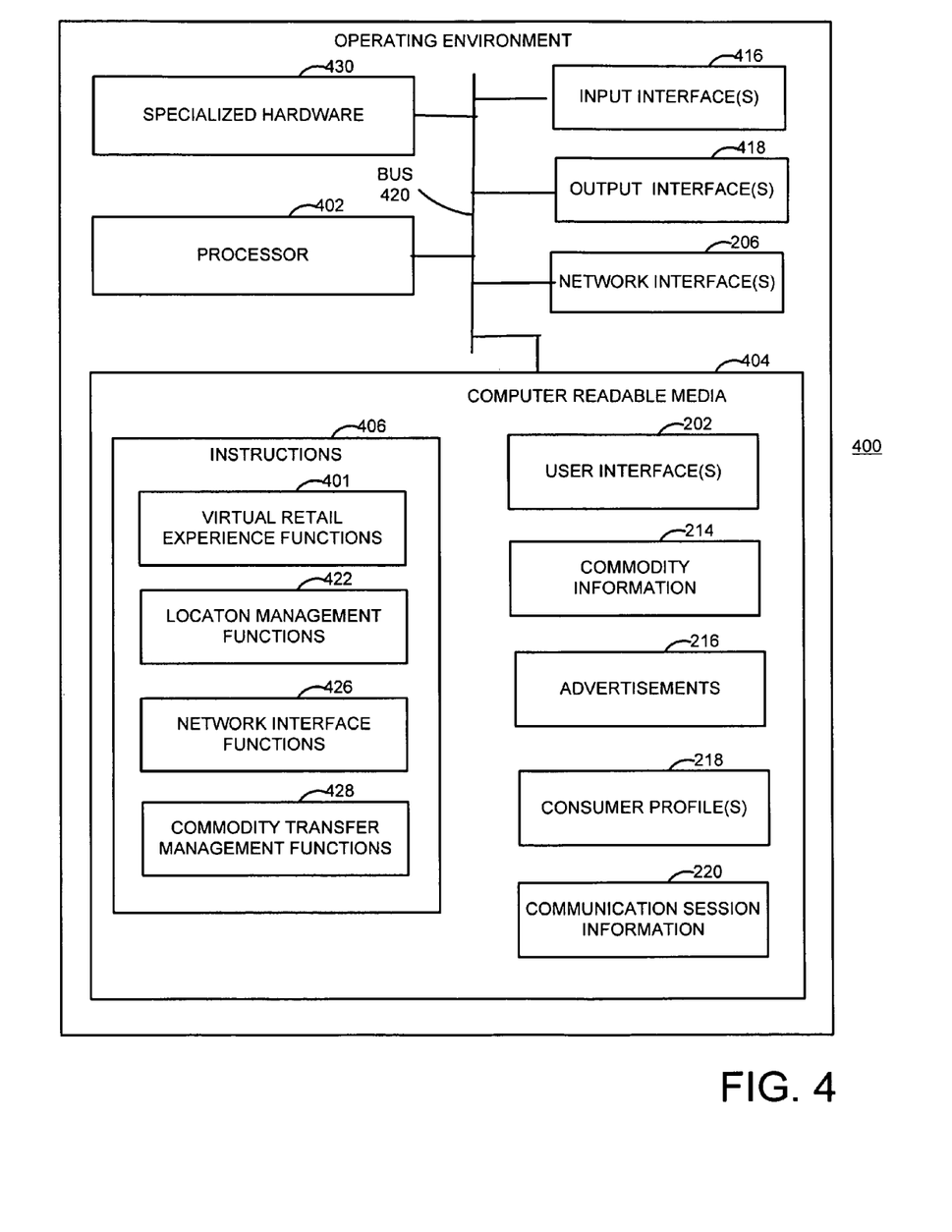
FIG. 4 is a simplified functional block diagram of an exemplary configuration of an operating environment in which the system shown in FIG. 2 may be implemented or used.

As shown, operating environment 400 includes processor 402, computer-readable media 404, and computer-executable instructions 406. One or more internal buses 420, which are widely available elements, may be used to carry data, addresses, control signals and other information within, to, or from operating environment 400 or elements thereof.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording or storing computer-readable data, such as computer-executable instructions 406, user interface(s) 202, commodity information 214, Advertisements 216, consumer profiles 218, and communication session information 220. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. Computer-readable media 404 may also include transmission media and data associated therewith.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement virtual retail experience functions 401, which implement aspects of user interface(s) 202 (shown in FIG. 2); certain computer-executable instructions 406 implement network interface functions 426, which implement aspects of network interface(s) 206; certain computer-executable instructions 406 implement location management functions 422, which implement aspects of location manager 262; and certain computer-executable instructions 406 implement commodity transfer management functions 428, which implement aspects of commodity transfer manager 208.

Input interface(s) 416 are physical or logical elements that facilitate receipt of input to operating environment 400. Input may be received using any type of now known or later-developed physical or logical elements, such as user interfaces, remote controls, displays, mice, pens, styluses, trackballs, keyboards, microphones, scanning devices, and all types of devices that are used input data.

Output interface(s) 418 are physical or logical elements that facilitate provisioning of output from operating environment 400. Output may be provided using any type of now known or later-developed physical or logical elements, such as user interfaces, displays, printers, speakers, disk drives, and the like.

Network interface(s) 206 (discussed in more detail above, in connection with FIG. 2) are one or more physical or logical elements that enable wireless communication by operating environment 400 via one or more protocols or techniques.

Specialized hardware 430 represents any hardware or firmware that implements functions of operating environment 400. Examples of specialized hardware 430 include encoder/decoders ("CODECs"), application-specific integrated circuits, and the like.

It will be appreciated that particular configurations of operating environment 400 or Virtual Retail System 150 may include fewer, more, or different components or functions than those described. In addition, functional components of operating environment 400 or System 200 may be implemented by one or more devices, which are co-located or remotely located, in a variety of ways.

Various aspects of wireless, location-based, E-commerce transactions have been described. Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A tangible computer-readable storage medium that does not consist of a propagated data signal, said tangible computer-readable storage medium being encoded with computer-executable instructions which, when executed by a processor, perform a method comprising:

monitoring locations of a mobile communication device operated by a consumer;

identifying a profile associated with the consumer;

based on monitoring, ascertaining a first location of the mobile communication device;

identifying a first merchant entity operating a first retail location within a service region of a wireless communication network having a wireless network node hosting services offered by a virtual retail system that provides the customer with a virtual retail experience on behalf of the first merchant entity;

when the first location is within the service region, establishing a wireless communication session between the mobile communication device and the wireless network node;

via the wireless communication session, when the mobile communication device is at the first location, transmitting to the mobile communication device information regarding a first commodity that is available for transfer on behalf of the first merchant entity;

arranging for an exchange of consideration between the consumer and the first merchant entity via the wireless communication session through the virtual retail system, the consideration from the consumer comprising a promise to receive advertising via the wireless communication session in exchange for the first commodity, to complete a virtual retail experience;

via the wireless communication session, collecting information regarding a behavior of the consumer, the behavior related to the virtual retail experience;

based on the collected information, updating the profile;

based on the updated profile, identifying a second merchant that has formed an affiliation with the first merchant based on the updated profile, wherein the second merchant operates a second retail location, said virtual retail system providing the customer with a virtual retail experience on behalf of the second merchant entity;

based on monitoring, ascertaining a second location of the mobile communication device;

determining a distance between the second location and the second retail location; and when the determined distance is less than a predetermined distance, wirelessly transmitting to the mobile communication device information regarding a second commodity that is available for transfer to the consumer on behalf of the second merchant entity through the virtual retail system, aspects of the virtual retail experience able to follow the consumer based on the collected information.

2. The computer-readable storage medium according to claim 1, further comprising:
via the wireless communication session, arranging for the communication device to present a user interface associated with the first retail location,
the information regarding the first commodity presented to the consumer via the user interface.

3. The computer-readable storage medium according to claim 1, wherein the first commodity selected from the group comprising: a commodity at the first retail location, a discount on a commodity at the first retail location, a digital media file, streaming digital media content, a service provided to the consumer via the wireless communication session, a license, and a redeemable article.

4. The computer-readable storage medium according to claim 1, wherein the first retail location is identified from among a plurality of retail locations within the service region.

5. The computer-readable storage medium according to claim 4, wherein at least two of the plurality of retail locations are operated by different merchant entities.

6. The computer-readable storage medium according to claim 4, wherein the first retail location is selected from the group comprising: a store having a plurality of departments comprising the plurality of retail locations; a mall having a plurality of stores comprising the plurality of retail locations; a theme park having a plurality of themed regions comprising the plurality of retail locations; and a public attraction having a plurality of geographical areas.

7. The computer-readable storage medium according to claim 1, wherein the collected information is selected from the group comprising: information input by the consumer via the mobile communication device; information provided by the consumer to the first merchant entity; information regarding location of the consumer with respect to the first retail location; consideration exchanged by the consumer; and communication device-collected information.

8. The computer-readable storage medium according to claim 1, wherein transmitting to the mobile communication device information regarding a first commodity comprises using the profile to customize the information associated with the first commodity.

9. An e-commerce system, comprising:
a computer-readable storage medium; and
a processor responsive to the computer-readable storage medium and to one or more computer programs stored in the computer-readable storage medium, the one or more computer programs comprising
a location manager configured to monitor locations of a mobile communication device operable by a consumer,
a network interface responsive to the location manager, the network interface configured to use a predetermined communication protocol to establish a wireless communication session between the mobile communication device and a wireless network node, and
a commodity transfer manager responsive to the location manager and the network interface,
the one or more computer programs, when executed by the processor, operable to perform a method comprising
identifying a profile associated with the consumer,
ascertaining a first location of the mobile communication device,
identifying a first merchant entity operating a first retail location within a service region of a wireless communication network having a wireless network node,
when the first location is within the service region, establishing a wireless communication session between the mobile communication device and the wireless network node,
via the wireless communication session, when the mobile communication device is at the first location, transmitting to the mobile communication device information regarding a first commodity that is available for transfer on behalf of the first merchant entity,
arranging for an exchange of consideration between the consumer and the first merchant entity via the wireless communication session, the consideration from the consumer comprising a promise to receive advertising via the wireless communication session in exchange for the first commodity, to complete a virtual retail experience,
via the wireless communication session, collecting information regarding a behavior of the consumer, the behavior related to the virtual retail experience,
based on the collected information, updating the profile,
based on the updated profile, identifying a second merchant that has formed an affiliation with the first merchant based on the updated profile, wherein the second merchant operates a second retail location,
ascertaining a second location of the mobile communication device,
determining a distance between the second location and the second retail location, and
when the determined distance is less than a predetermined distance, wirelessly transmitting to the mobile communication device information regarding a second commodity that is available for transfer to the consumer on behalf of the second merchant entity, aspects of the virtual retail experience able to follow the consumer based on the collected information.

10. The system according to claim 9, wherein the system comprises a client-side operating environment.

11. The system according to claim 10, wherein the client-side operating environment is implemented within one of a mobile phone, a personal digital assistant, a portable digital media player, a computer, and a vehicle-mounted device.

12. The system according to claim 9, wherein the system comprises a server-side operating environment.

13. The system according to claim 12, wherein the server-side operating environment is implemented by one of a point-of-presence server operated on behalf of the first merchant entity within a wireless local area network at the first retail location, and a server within a wide-area network.

* * * * *